US010801842B2

(12) United States Patent
Patel (10) Patent No.: US 10,801,842 B2
(45) Date of Patent: Oct. 13, 2020

(54) SHORTEST PATH ENGINE FOR WAREHOUSE MANAGEMENT

(71) Applicant: ORACLE INTERNATIONAL CORPORATION, Redwood Shores, CA (US)

(72) Inventor: Bimal Patel, Middlesex (GB)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 14/564,419

(22) Filed: Dec. 9, 2014

(65) Prior Publication Data

US 2016/0161263 A1    Jun. 9, 2016

(51) Int. Cl.
*G01C 21/20* (2006.01)
*G01C 21/34* (2006.01)
*G06Q 10/04* (2012.01)

(52) U.S. Cl.
CPC ....... *G01C 21/206* (2013.01); *G01C 21/3446* (2013.01); *G06Q 10/047* (2013.01)

(58) Field of Classification Search
None
See application file for complete search history.

(56) References Cited

U.S. PATENT DOCUMENTS

| | | | | |
|---|---|---|---|---|
| 2006/0161597 A1* | 7/2006 | Ougarov | ........... | G06F 17/30575 |
| 2007/0130133 A1* | 6/2007 | Lee | ................... | G06F 17/30415 |
| 2007/0156372 A1* | 7/2007 | Christ | .................. | G06Q 10/04 |
| | | | | 702/158 |
| 2010/0211244 A1* | 8/2010 | Jeong | ..................... | G01C 21/20 |
| | | | | 701/25 |
| 2012/0130632 A1* | 5/2012 | Bandyopadhyay | .... | G01C 17/38 |
| | | | | 701/446 |
| 2014/0172810 A1* | 6/2014 | Paradies | ........... | G06F 17/30315 |
| | | | | 707/705 |
| 2014/0172827 A1* | 6/2014 | Nos | .................... | G06F 17/30424 |
| | | | | 707/722 |
| 2015/0256442 A1* | 9/2015 | Hu | .......................... | H04L 45/02 |
| | | | | 370/254 |

OTHER PUBLICATIONS

Bartholdi, III et al.; Warehouse & Distribution Science Release 0.95, The Supply Chain and Logistics Institute School of Industrial and Systems Engineering, Georgia Institute of Technology, Atlanta, GA, Revised Aug. 21, 2011.
Amit J. Patel; Amit's Game Programming Information, (part of Red Blob Games); 2014; downloaded from: http://www-cs-students.stanford.edu/~amitp/gameprog.html#Paths; pp. 1-15.

* cited by examiner

*Primary Examiner* — Sujay Koneru
*Assistant Examiner* — Mohamed N El-Bathy
(74) *Attorney, Agent, or Firm* — Kraguljac Law Group, LLC (57) ABSTRACT

Systems, methods, and other embodiments associated with a shortest path engine for warehouse management are described. In one embodiment, a method determines a shortest path between a first location and a second location. The method includes receiving a request for a shortest path between a first location and a second location and accessing a first data structure. The first data structure maps the first location to a first reference point and the second location to a second reference point. A shortest path between the first reference point and the second reference point is determined and the determined shortest path is returned.

15 Claims, 6 Drawing Sheets

Figure 6

SHORTEST PATH ENGINE FOR WAREHOUSE MANAGEMENT

BACKGROUND

Calculating optimum paths for equipment or personnel in a warehouse is important to warehouse efficiency. An optimum path is the "best" path (based on some criteria, often time and/or distance) between locations that hold goods that fulfill orders. Optimum paths can be used to organize the sequence in which orders are filled, estimate the time that will be necessary to fill a set of orders, equally divide orders amongst pickers based on the amount of time that will necessary to fill the orders, determine the manpower necessary to fill a set of orders, and so on. Due to the processing overhead associated with determining optimum paths, especially in large warehouses, the path calculation is typically a batch driven preprocessing stage of the organizing and sequencing of warehouse work.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Traditional approaches to optimum path calculation utilize Dijkstra's path finding algorithm implemented as a standalone or database specific solution that reads a large dataset of locations and calculates optimum paths in a batch operation. The described embodiments use a more optimized A* graph path finding algorithm that uses reference pints as nodes in a graph together with the distance between them as edges. The graphs are maintained in the memory of a database (e.g., such as Oracle database and its integrated Java Virtual Machine (JVM) capability).

Existing solutions transfer large datasets of locations from client memory into working memory in a database server, which is very time consuming because of the large datasets that have to be passed across network connections. Existing solutions are also resource intensive because calculations are performed each time a shortest path is calculated, resulting in solutions that many seconds to calculate a single optimum path length in a large warehouse. The described embodiments build a memory based graph when a search is first performed. Searches for the shortest path (e.g., using the A* algorithm) between subsequent source and target reference points are then performed using this graph and results of searches are cached to further improve speed.

Changes to reference point data or location data in the schema (e.g., because of an unforeseen incident) trigger topological changes in the stored graph and cached searches that involve any changed reference points are discarded.

For warehouse management systems that require labor management, equipment classification and pick order optimization, a graph is built using both the distance between reference points and particular weighting rules (e.g., a time or distance penalty because equipment can only turn at a set speed). The graph is searched and discarded without any caching after the API call for the shortest path search completes.

Systems and methods are described herein that provide a shortest path engine and accompanying warehouse schema that allow the optimum path calculation to be performed in database memory, resulting in optimum path calculations that can be performed in real time (e.g., tens of microseconds). The described solution recognizes that in a warehouse setting, many locations are reached by way of some common point in the warehouse. For example, all 80 locations in a three or four level rack that holds 80 types of goods are accessed by entering the aisle in front of the rack from a given cross-aisle point. The warehouse schema maps individual locations to these common access points, called reference points. Rather than calculating an optimum path between individual locations in a warehouse, of which there may be millions, the shortest path engine calculates the optimum path between the reference points to which locations are mapped. The distance and/or route between the start and end locations and their respective reference points is added to the shortest path determined between the reference points mapped to the start and end locations.

There will typically be many locations mapped to each reference point, resulting in orders of magnitude fewer points that are considered in finding the shortest path between reference points as opposed to warehouse locations. This allows the path finding solution to be implemented, in its entirety, in database memory. Because the underlying data structures in the warehouse schema reside in database memory, caching and automatically triggered update functions supported by the database system can be leveraged to maintain the data structures. While systems and methods will be described in the context of warehouse management, the systems and methods described herein are equally applicable in any context in which optimum paths between large numbers of locations are calculated.

Figure 1:
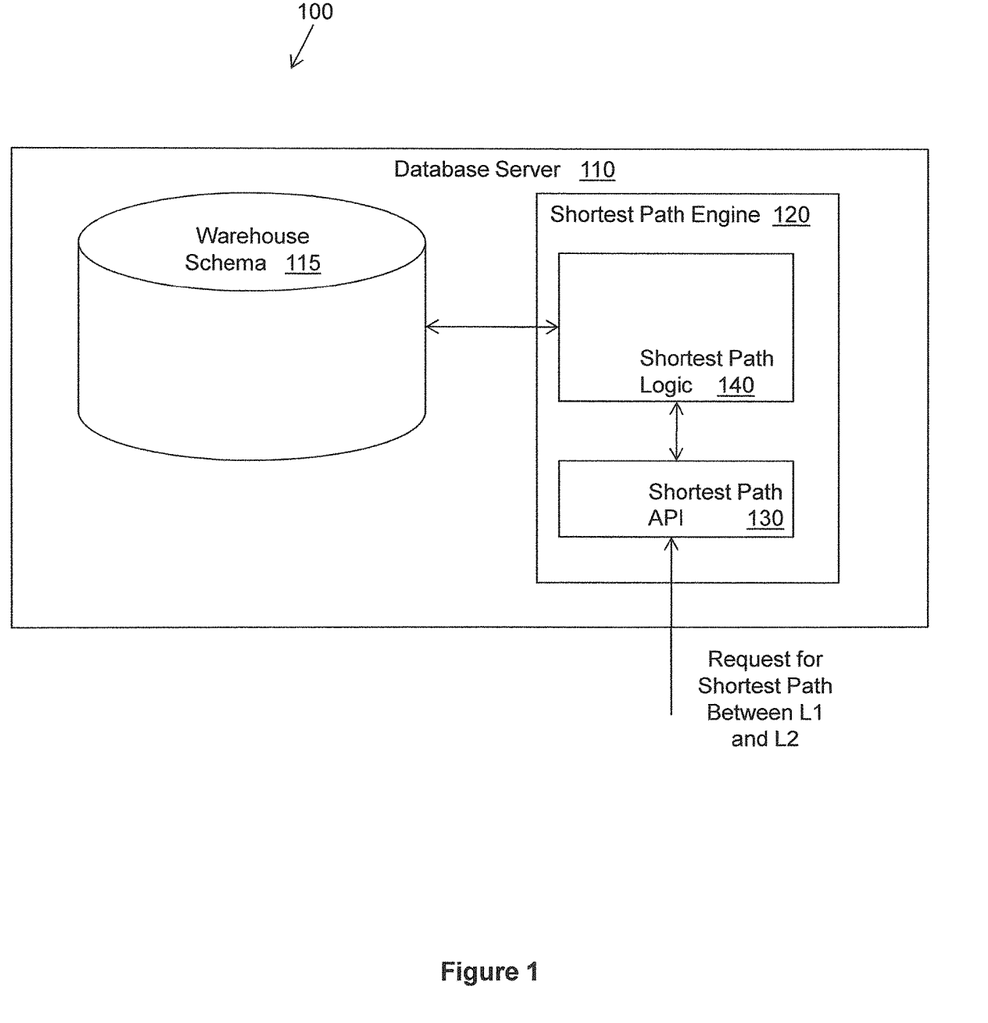
FIG. 1 illustrates one embodiment of a system associated with a shortest path engine for warehouse management.

With reference to FIG. 1, one embodiment of a system 100 associated with a shortest path engine for warehouse management is illustrated. The system 100 includes a database server 110 that hosts a database system that includes a warehouse schema 115 and a shortest path engine 120. The shortest path engine 120 includes a shortest path API 130 that receives requests and a shortest path logic 140 that accesses the warehouse schema 115 to calculate the shortest path between a first reference point mapped to a start location (L1) and a second reference point mapped to an end location (L2).

As will be described in more detail below, each location is mapped to a reference point together with a flag that describes a direction for the connection between the location and the reference point. The flag can have a value of inbound (meaning the reference point is used as a primary entry point to the location); outbound (meaning the reference point is used as a primary exit point from the location); both (meaning the reference point is used as both a primary entry point and a primary exit point for the location); alternate inbound (meaning the reference point is used as an alternate entry point to the location); alternate outbound (meaning the reference point is used as an alternate exit point from the location); and alternate both (meaning the reference point is used both as an alternate entry point and an alternate exit point for the location).

The shortest path API 130 is called by a warehouse management logic (not shown) that resides in the database as part of a user screen interaction or a batch process. The request to API 130 includes a start location and one or more end locations as well as an indication as to whether the locations are accessed in the primary manner (e.g., using primary entry and exit points) or in the alternate manner (e.g., using alternate entry and exit points).

The API 130 calls the shortest path engine 120 to perform a shortest path search between the reference points mapped to the locations in the request. When caching is used (see FIG. 3), the shortest path engine 120 first checks the cache to determine if a shortest path between the reference points has already been performed. If so, the shortest path engine 120 returns the shortest path to the API as a map of transit paths together with each search path. If a shortest path between the reference points is not in cache, the shortest path engine 120 calls the shortest path logic 140 to perform a search for the shortest path between the reference points.

A valid result from the shortest path logic 140 is passed back to the shortest path engine 120. The shortest path engine 120 adds the shortest path to the cache prior to returning the map of transit paths to the API 130. A non valid result from the shortest path logic 140 is returned as an infinite path length by the shortest path engine 120 to the API 130.

The shortest path logic 140 calculates the distance between each location and its associated entry reference point and exit reference point. These distances are added to the total length of the shortest path between the reference points. The resulting path length is returned, along with the transit path between the reference points, to the calling warehouse management logic.

Figure 2:
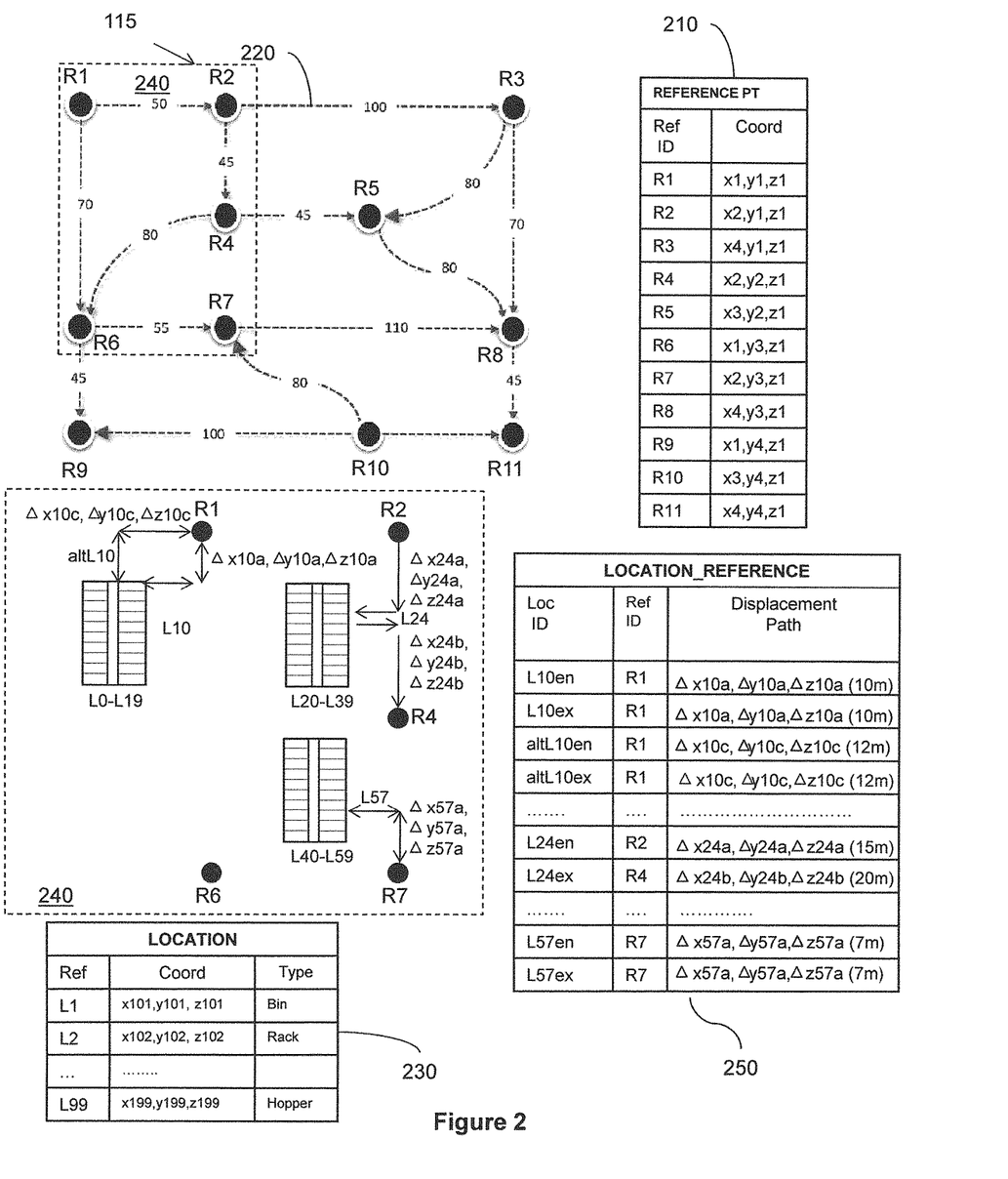
FIG. 2 illustrates a warehouse schema that is used to support an embodiment of a shortest path engine for warehouse management.

Referring now to FIG. 2, one embodiment of the warehouse schema 115 is illustrated. The schema 115 includes a reference point table 210 that stores a collection of reference point instances with coordinates for a given facility. The reference points are common access points that are used to access many locations. For example, the reference points might be points where aisles between structures storing goods cross. A directed graph 220 is constructed that includes the reference points as nodes and the sum of the distances in all dimensions (e.g., x,y,z) between the reference points as edges between the nodes. The directed graph 220 captures directional information as illustrated by the arrows on the edges to capture desired traffic flow patterns.

A location table 230 is populated with all locations in the warehouse and the locations' respective coordinates. The location table 230 also records a location type (e.g., bin, rack, and so on). The location type information may be used when mapping out routes for various types of picking and stocking equipment. Each location is mapped to a closest reference point as illustrated in the location diagram 240, which shows locations L0-L59 and the reference points R1, R2, R4, R6, and R7 near those locations. The mapping information is stored in a location reference table 250. The location reference table 250 records the location ID, the reference point ID to which the location ID is mapped, and a displacement path that describes the displacement, in all dimensions, between the location and the reference point.

For example, in the diagram 240 it can be seen that L57 is mapped to R7. In one embodiment, each location is mapped in two ways to reference points. A location is mapped to an entry reference point used when the location is the destination of a path and an exit reference point used when the location is the origin of a path. This allows the shortest path engine 120 (FIG. 1) to honor traffic flow patterns in aisles. Thus, in the location reference table 250, there are two rows for L57: an L57en for entry and an L57ex for exit. The aisle in front of L57 supports two-way traffic flow so both the entry reference point and the exit reference point are R7 and the same displacement path is stored in both rows.

The aisle in front of L24 is one way. L24en is mapped to R2 (e.g., for when L24 is the destination of the path) and L24ex is mapped to R4 (e.g., for when L24 is the origin of the path). Thus, for L24 a different reference node and a different displacement path are stored in the rows for L24en and L24ex.

In some warehouse structures, locations can be accessed in different ways. For example, L10 is accessed from the "front" when items are picked from the location to fill orders and from the "back" when items are stocked in the location. This may be the case when the location employs a feeder mechanism, like a hopper, that dispenses items through one opening and is stocked through a different opening. Thus, a location may be mapped to different reference points depending on the manner in which the location is being accessed in a given path. The location reference table 250 includes rows for altL10en and altL10ex that map L10 to reference point R1 when L10 is accessed in the "alternate" (e.g., stocking vs. picking) manner. In the illustrated embodiment, L10 is mapped to R1 in all combinations of primary/alternate manner and entry/exit options. Of course, a location can be mapped to four different reference points.

In one embodiment, the location reference table 250 is populated lazily, meaning that locations are not added to the table until a request for a shortest path that includes the location is processed. When a new location is included in a request, the location type table and reference point tables can be accessed to determine the closest reference point to the location as well as the displacement path between the location and the reference point. A row for the location is populated with the location ID, the reference point ID, and the displacement path and is stored in the table 250. The shortest path engine 140 can then determine the shortest path between reference points mapped to the start and end locations and return a result. In this manner, the number of calculations that are performed at system set up are reduced.

The reference point table 210, the directed graph 220, the location type table 230, and the location reference table 250 together form the warehouse schema 115 that allows optimum path calculation to be performed in a shared memory environment. Database functionality can be used to keep data underlying the shortest path calculations up to date. When a location is moved, a change to the location type table 230 can trigger re-mapping operations that revise or invalidate the rows in the location reference table 250 for the moved location. Likewise, changes to the location of a reference point in table 210, which should seldom occur, can trigger a recalculation of the directed graph 220 as well as appropriate automatic revisions to the location reference table 250.

Figure 3:
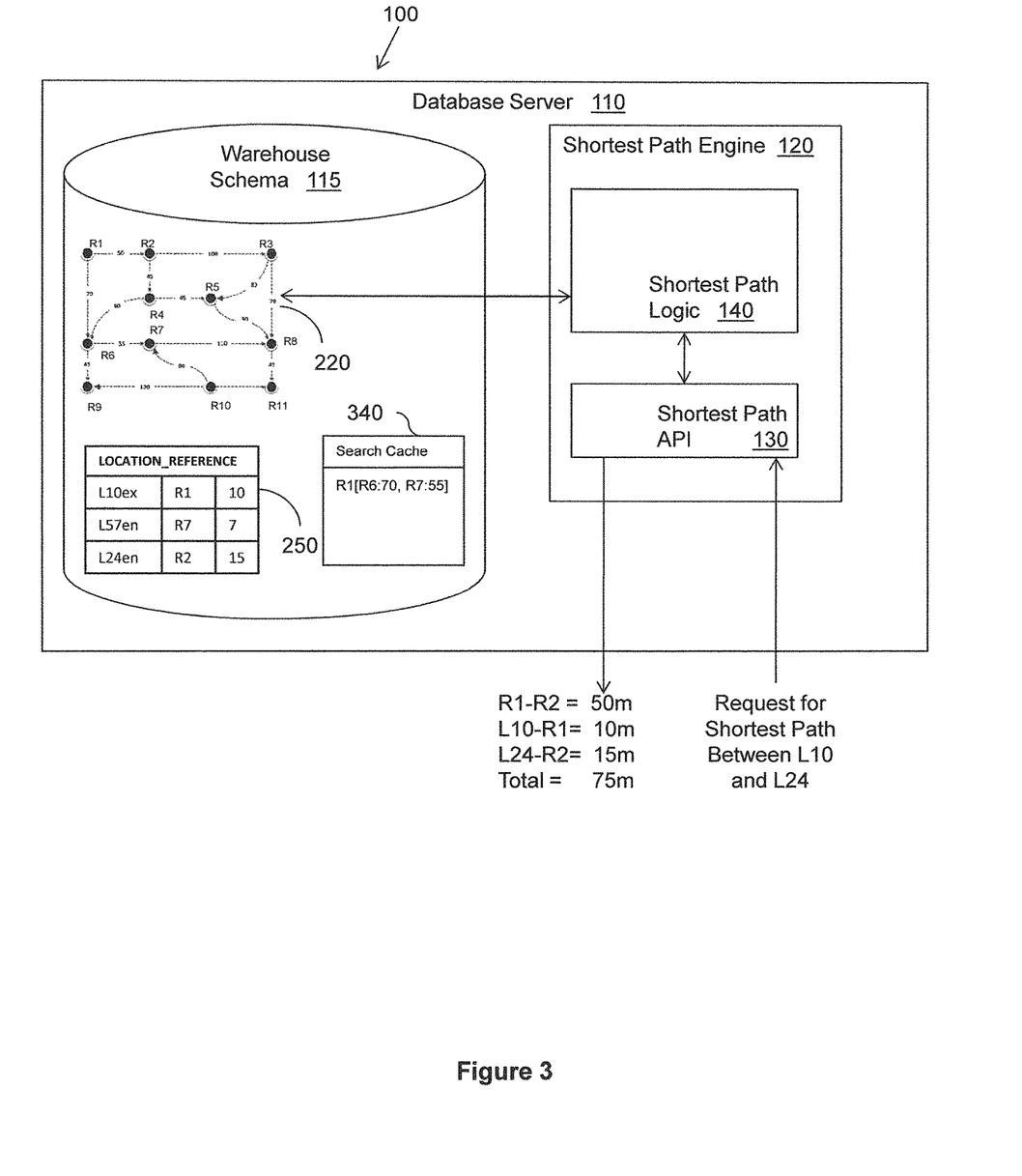
FIG. 3 illustrates an example of how the warehouse system of FIG. 1 and the warehouse schema of FIG. 2 can be used to determine a shortest path.
Figure 4:
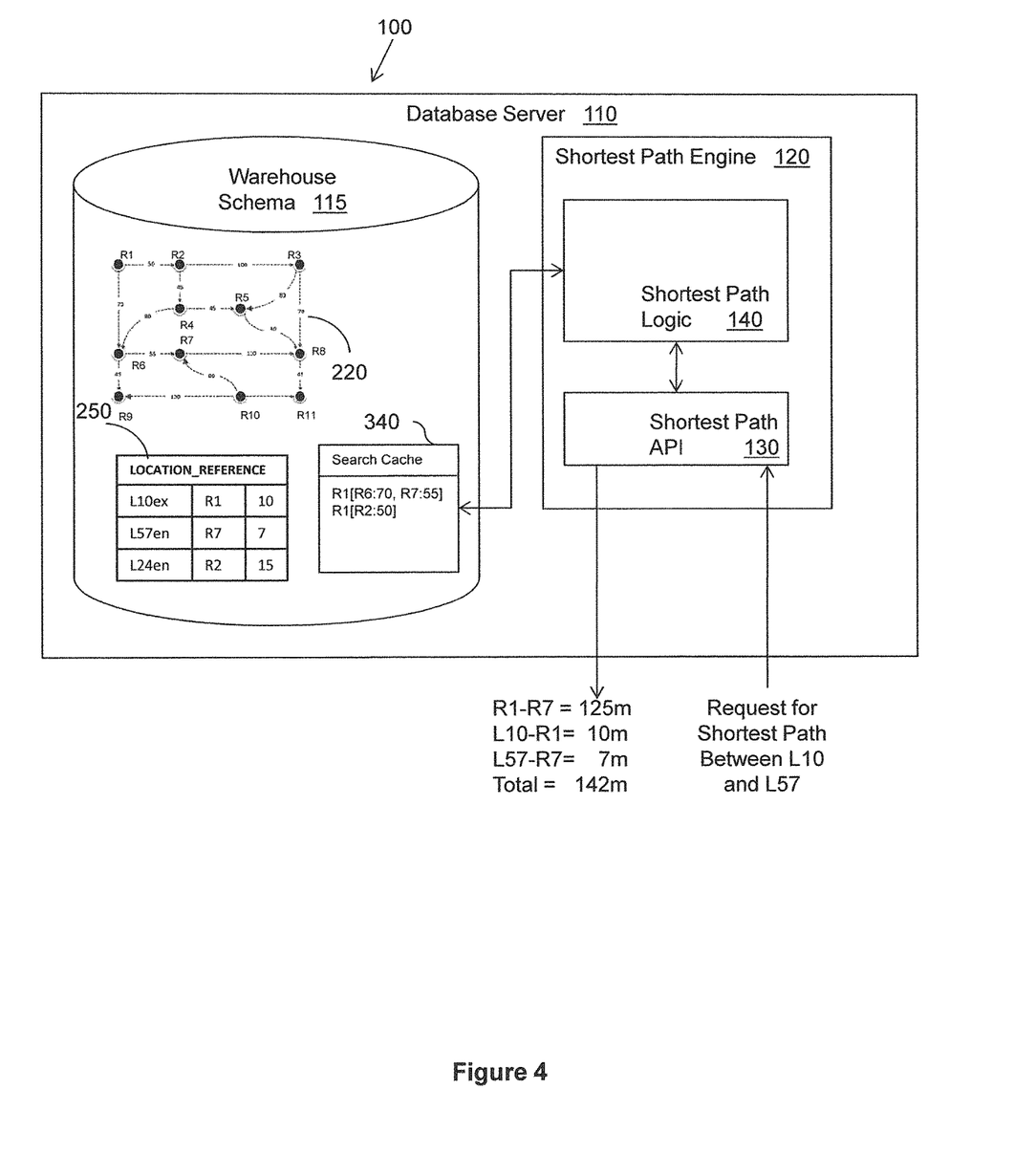
FIG. 4 illustrates another example of how the warehouse system of FIG. 1 and the warehouse schema of FIG. 2 can be used to determine a shortest path.

FIGS. 3 and 4 illustrate how the shortest path engine 120 interacts with the warehouse schema 115 to calculate an optimum path between a starting location and an end location. In FIGS. 3 and 4 the warehouse schema 115 includes a search cache 340 that stores previously calculated shortest paths between pairs of reference points. The search cache is supported by the database system and is managed in a same manner as other caches. This means the search cache is automatically synchronized to the memory model and is automatically updated to reflect locations or reference points that have moved, and so on.

In FIG. 3, a user requests the shortest path between start location L10 and end location L24. The shortest path API 130 receives the request and calls the shortest path logic 140 with the start location of L10 and the end location of L24. The shortest path logic 140 accesses the location reference table 250 to identify that L10ex (meaning that L10 is the origin of the path) is mapped to R1 and L24en (meaning that L24 is the destination of the path) is mapped to R2. Before calculating the shortest path between R1 and R2, the shortest path logic 140 checks the search cache 340 to determine if a shortest path between R1 and R2 has already been cached. As can be seen in FIG. 3, the search cache 340 does not have an entry for a path between R1 and R2.

The shortest path logic 140 then accesses the directed graph 220 and uses the A* or other appropriate algorithm to calculate a shortest path between R1 and R2. The optimum path between R1 and R2 is determined to be a direct route between R1 and R2 with a distance of 50 meters. The shortest path logic 140 accesses the location reference table 250 to determine the displacement paths between the start and end locations and their respective reference points. The displacement paths are added to the shortest path and included in the result. The shortest path has been determined to be a path from L10 to R1, R1-R2, and R2 to L24, corresponding to a total distance of 75 meters. Before returning a result, the shortest path logic 140 adds the shortest path between R1 and R2 to the cache, as shown in FIG. 4.

In FIG. 4, a user requests the shortest path between start location L10 and end location L57. The shortest path API 130 receives the request and calls the shortest path logic 140 with the start location of L10 and the end location of L57. The shortest path logic 140 accesses the location reference table 250 to identify that L10ex (meaning that L10 is the origin of the path) is mapped to R1 and L57en (meaning that L57 is the destination of the path) is mapped to R7. Before calculating the shortest path between R1 and R7, the shortest path logic 140 checks the search cache 340 to determine if a shortest path between R1 and R7 has already been cached. The search cache 340 has an entry for a shortest path between R1 and R7 with a distance of 125 meters. The shortest path logic 140 accesses the location reference table 250 to determine the displacement paths between the start and end locations and their respective reference points. The displacement paths are added to the shortest path and included in the result. The shortest path has been determined to be a path from L10 to R1, R1-R6-R7, and R7 to L57, having a length of 142 meters.

In FIGS. 3 and 4, a shortest path between two locations is calculated. In most cases, the request will include many locations, with only a start location and an end location specified. When there are more than two locations, each location is mapped to its reference point and the shortest path logic 140 determines an optimum path starting at the exit reference point mapped to the start location and ending at the entry reference point mapped to the end location. At each step in the path, the shortest path logic 140 finds the closest reference point to the current reference point, and so on. When multiple locations share the same reference point, the shortest path logic 140 assumes that the locations are in the same aisle and a direct distance calculation between the locations is calculated and added to the path's distance. When one or more locations have a different entry and exit point, the shortest path logic 140 performs parallel searches with the different entry and exit points, and uses the shortest path found in the parallel searches.

Returning to FIG. 1, several particular embodiments of the system 100 will be described. In one embodiment, the shortest path engine 120 includes executable Java code that is loaded as the Java Virtual Machine (JVM) in an Oracle® 11gR2® or 12C® database system. The database system supports an internal driver class that allows the shortest path engine 120 to connect to the warehouse schema 115 using an integrated Java Database Connectivity (JDBC) compliant interface. This embodiment is thread-safe and can be invoked by concurrent calling SQL functions in a technology agnostic manner (e.g., a non-Java external application can use the shortest path API using its own database connector technology). The benefit of this approach is that the internal database JVM does not have to use a network connection to the warehouse management schema and is therefore very fast. In other embodiments, the shortest path engine 120 can be run as a standalone application, such as a standalone JVM on an application server like WebLogic®, a desktop or server JVM, or a Servlet container.

The shortest path logic 140 accesses the warehouse schema 115 and uses a selected algorithm to determine the shortest path between a first reference point mapped to a start location (L1) and a second reference point mapped to an end location (L2). In one embodiment, the shortest path logic 140 uses the A* Path Finding Algorithm, which is an improvement of the Dijkstra Path Finding Algorithm utilized by many traditional optimum path finding solutions. However, performance improvement of path finding calculations can be achieved using any of a number of path finding algorithms on the warehouse schema 115.

In one embodiment, the shortest path API 140 is integrated into the database system's JVM. The shortest path API 140 can support both Java and SQL based access to the shortest path logic 140. In one embodiment, the shortest path API 130 generates a call to the shortest path logic 140 in the following format:

shortestPathMap (Facility f, Location start, Location end, Double maxCost, Boolean useAltForStart, Boolean useAltForEnd)

The value of f identifies the facility and is used by the shortest path logic 140 to identify which tables in the warehouse schema to access. The Boolean identifies whether a primary or alternate manner is being used to access the locations (e.g., a primary (order filling) manner or an alternate (stocking) manner). The call returns a Map<String, Double> of the shortest path where the double value is the sum of x,y,z deltas from the previous node. To return a string representation of the Map that can be decoded by the caller, the shortest path API 130 generates the following call:

String shortestPathMapInfo (String facilityID, String start, String end, String useAltForStart, String useAltForEnd)

A Java class wraps various helper methods to determine the shortest path and other path finding functions such that they translate SQL types to Java values for operation within the PL/SQL runtime environment of the database system. This allows stored procedures and library APIs to utilize the shortest path functionality within the database instance.

In a Java based implementation, the shortest path engine classes can be organized into the following packages: rwms.geom, rwms.events, rwms.astar, and rwms root. The rwms.geom package holds base classes representing locations and reference points. Both classes extend an abstract geometry class that holds a string ID value as well as double precision, x, y, and z values. In addition, the location class holds alternate x, y, and z values if present. The rwms.events package holds event source, listeners, and exception classes. A facility instance fires events when locations or reference points are added or removed in its model and a listener can be registered to observe such events for logging or other purposes. rwms.astar is a self contained package that contains classes for directed graphs with nodes (mapped to reference points) and edges (calculated from mappings between reference points together with costs based on distances between nodes). The package also contains a cache class that is used by each facility to hold valid search paths to avoid recalculating searches. The rwms root package holds classes that include Math utilities, SQL adapters, graph model loaders, helpers and a Facility class.

Figure 5:
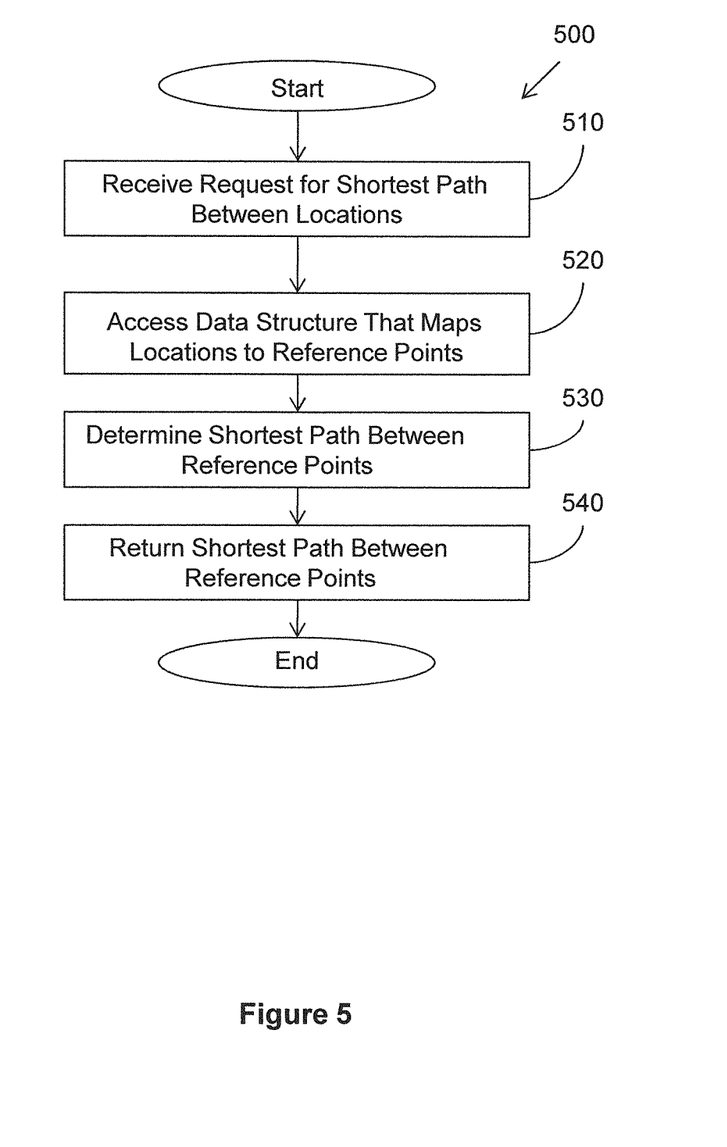
FIG. 5 illustrates a method performed by an embodiment of a shortest path engine for warehouse management.

FIG. 5 illustrates one embodiment of a method 500 that determines a shortest path between a first location and a second location. The method 500 may be performed by the shortest path logic 140 of FIG. 1. The method includes, at 510, receiving a request for a shortest path between a first location and a second location. At 520, the method includes accessing a first data structure that maps the first location to a first reference point and the second location to a second reference point. At 530, a shortest path between the first reference point and the second reference point is determined, and at 540, the determined shortest path is returned.

As can be seen from the foregoing description, described herein is a shortest path engine and accompanying warehouse schema that allows an optimum path calculation to be performed in database memory, resulting in optimum path calculations that can be performed in real time.

Computing Device Embodiment

Figure 6:
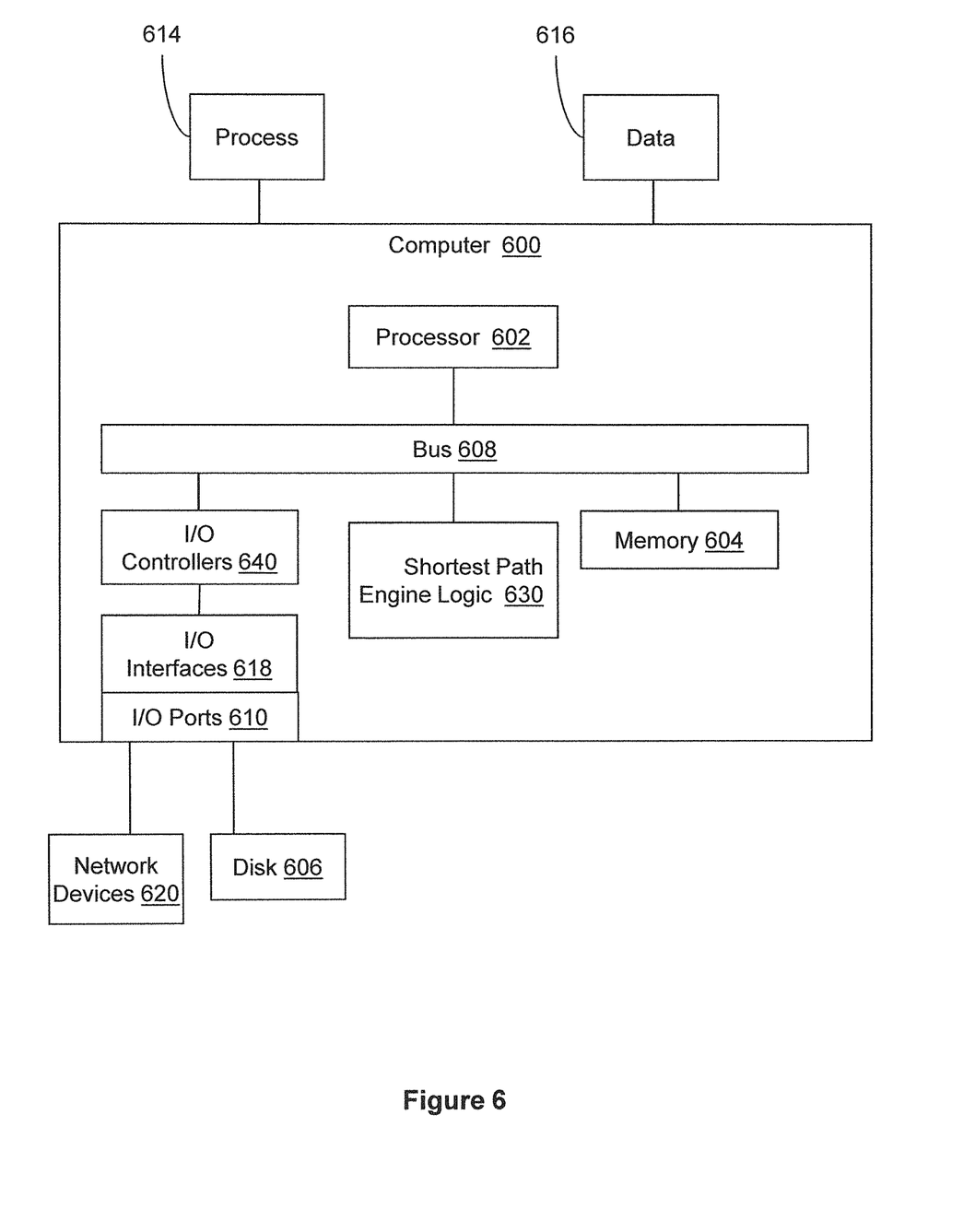
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 includes shortest path engine logic 630 configured to provide determine a shortest path between locations in a warehouse.

The shortest path engine logic 630 is similar to shortest path engine 120 described with respect to FIGS. 1-4 and in some embodiments performs the method 600 of FIG. 4. In different examples, the shortest path engine logic 630 may be implemented in hardware, a non-transitory computer-readable medium with stored instructions, firmware, and/or combinations thereof. While the shortest path engine logic 630 is illustrated as a hardware component attached to the bus 608, it is to be appreciated that in one example, the shortest path engine logic 630 could be implemented in the processor 602.

In one embodiment, shortest path engine logic 630, or the computer is a means (e.g., hardware, non-transitory computer-readable medium, firmware) for performing the functions for automatically creating a target definition for a software product release process for determining a shortest path between locations in a warehouse s described with respect to FIGS. 1-5.

In one embodiment, shortest path engine logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on).

The means may be implemented, for example, as an application specific integrated circuit (ASIC) programmed to perform the functions described with respect to FIGS. 1-5. The means may also be implemented as stored computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disc-ROM (CD-ROM) drive, a CD recordable (CD-R) drive, a CD rewritable (CD-RW) drive, a digital video disk (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the input/output (I/O) interfaces 618, and/or the I/O ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer cause the computer to perform corresponding functions, the functions comprising:
   defining in a database a plurality of reference points in a facility where each reference point is defined as one common access point from a plurality of common access points identified by coordinates in the facility, where a common access point includes a point where aisles cross within the facility that are used to access multiple locations within the facility;
   maintaining (i) location point data within the database according to a database schema, wherein the location point data identifies location points within the facility, and (ii) a database cache within database memory of the database;
   wherein each location point is mapped to one of the common access points that is closest to the location point and includes: a displacement path to the common access point, and a flag that describes a direction for a connection between the location point and the common access point;
   in response to receiving a request for a shortest path between a first location and a second location in the facility, accessing the database to identify (i) a first reference point from the common access points that is mapped to the first location and (ii) a first displacement path between the first location and the first reference point, and identify (i) a second reference point from the common access points that is mapped to the second location and (ii) a second displacement path between the second location and the second reference point;
   searching the database cache to determine whether the database cache comprises a cached shortest path between the first reference point and the second reference point from a prior shortest path determination;
   responsive to identifying the cached shortest path, returning the cached shortest path in response to the request; and
   responsive to not identifying the cached shortest path:
      determining the shortest path between the first reference point and the second reference point using a shortest path engine to perform calculations to execute a shortest path algorithm within the database memory to determine the shortest path between the first reference point and the second reference point;
      wherein determining the shortest path between the first and second reference points includes executing an A* Path Finding algorithm upon a memory based graph, wherein the memory based graph comprises interlinked reference points having distances between reference points as edges;
      storing the determined shortest path within the database cache;
      generating a total shortest path by adding (i) the first displacement path, (ii) the shortest path between the first reference point and the second reference point, and (iii) the second displacement path; and
      returning the total shortest path in response to the request;
   wherein the first data structure and the shortest path engine are resident in the same database server; and
   wherein the shortest path engine comprises an executable Java program stored in a Java Virtual Machine in the database server.

2. The non-transitory computer storage medium of claim 1, the functions further comprising:
   mapping, in a first data structure, each location point to one of the common access points that is closest to the location point in the facility;
   accessing a second data structure that stores routes between locations and respective reference points to which the locations are mapped in the first data structure;
   selecting a first route between the first location and the first reference point and a second route between the second location and the second reference point; and
   returning the first route and the second route with the shortest path.

3. The non-transitory computer storage medium of claim 1, the functions for determining the shortest path further comprising:
   determining a requirement associated with moving an item between the first location and the second location;
   determining a weighting rule corresponding to the requirement; and
   deriving a memory based graph from (i) a distance between reference points and (ii) the weighting rule.

4. The non-transitory computer storage medium of claim 1, where a first data structure maps each location to: i) an entry reference point closest to the location when the location is a destination of the shortest path and ii) an exit reference point closest to the location when the location is an origin of the shortest path, the functions further comprising:
   selecting the exit reference point for the first location; and
   selecting the entry reference point for the second location.

5. The non-transitory computer storage medium of claim 1, where a first data structure maps each location to: i) a primary reference point closest to the location when the location is accessed in a primary manner and ii) an alternate reference point closest to the location when the location is accessed in an alternate manner, the functions further comprising:
   determining a manner in which the first location and the second location will be accessed;
   when the first location and the second location will be accessed in the primary manner, selecting the primary reference point for the first location and selecting the primary reference point for the second location; and
   when the first location and the second location will be accessed in the alternate manner, selecting the alternate reference point for the first location and selecting the alternate reference point for the second location.

6. The non-transitory computer storage medium of claim 5, where the primary manner comprises retrieving items from the location and the alternate manner comprises stocking the location with items.

7. A computing system comprising:
   a processor connected to memory; and
   a module stored on a non-transitory computer readable medium and configured with instructions that when executed by the processor cause the processor to:
      define in a database a plurality of reference points in a facility where each reference point is defined as one common access point from a plurality of common access points identified by coordinates in the facility, where a common access point includes a point where aisles cross within the facility that are used to access multiple locations within the facility;
      maintain (i) location point data within the database according to a database schema wherein the location point data identifies location points within the facility, and (ii) a database cache within database memory of the database;
wherein each location point is mapped, in a first data structure, to one of the common access points that is closest to the location point and includes: a displacement path to the common access point, and a flag that describes a direction for a connection between the location point and the common access point;
in response to receiving a request for a shortest path between a first location and a second location in the facility, access the database to identify (i) a first reference point from the common access points that is mapped to the first location and (ii) a first displacement path between the first location and the first reference point, and identify (i) a second reference point from the common access points that is mapped to the second location and (ii) a second displacement path between the second location and the second reference point;
search the database cache to determine whether the database cache comprises a cached shortest path between the first reference point and the second reference point from a prior shortest path determination;
responsive the identifying the cached shortest path, return the cached shortest path in response to the request; and
responsive to not identifying the cached shortest path:
 determine the shortest path between the first reference point and the second reference point using a shortest path engine to perform calculations to execute a shortest path algorithm within the database memory to determine the shortest path between the first reference point and the second reference point;
 store the determined shortest path within the database;
 generate a total shortest path by adding (i) the first displacement path, (ii) the shortest path between the first reference point and the second reference point, and (iii) the second displacement path; and
 return the total shortest path in response to the request;
wherein the first data structure and the shortest path engine are resident in the same database server;
wherein the shortest path engine comprises an executable Java program stored in a Java Virtual Machine in the database server; and
wherein the shortest path engine is configured to determine the shortest path between the first and second reference points by executing an A* Path Finding algorithm upon a memory based graph, wherein the memory based graph comprises interlinked reference points having distances between reference points as edges.

8. The computing system of claim 7, wherein the instructions cause the processor to determine the shortest path by:
determining a requirement associated with moving an item between the first location and the second location;
determining a weighting rule corresponding to the requirement; and
using a graph derived from (i) a distance between reference points and (ii) the weighting rule to determine the shortest path.

9. The computing system of claim 7, wherein the instructions cause the processor to store a second data structure that stores routes between locations and respective reference points to which the locations are mapped in the first data structure, and where the shortest path engine is configured to:
select a first route between the first location and the first reference point and a second route between the second location and the second reference point; and
return the first route and the second route with the shortest path.

10. A computer-implemented method, comprising:
defining, in a database, a plurality of reference points in a facility where each reference point is defined as one common access point from a plurality of common access points identified by coordinates in the facility, where a common access point includes a point where aisles cross within the facility that are used to access multiple locations within the facility;
maintaining, by at least a processor, (i) location point data within the database according to a database schema and (ii) a database cache within database memory of the database;
mapping, in a first data structure, each location point to one of the common access points that is closest to the location point in the facility and includes: a displacement path to the common access point, and a flag that describes a direction for a connection between the location point and the common access point;
in response to receiving a request for a shortest path between a first location and a second location in the facility, accessing the database to identify (i) a first reference point from the common access points that is mapped to the first location and (ii) a first displacement path between the first location and the first reference point, and identify (i) a second reference point from the common access points that is mapped to the second location and (ii) a second displacement path between the second location and the second reference point;
searching, by at least the processor, the database cache to determine whether the cache comprises a cached shortest path between the first reference point and the second reference point from a prior shortest path determination;
responsive the identifying the cached shortest path, returning, by at least the processor, the cached shortest path in response to the request; and
responsive to not identifying the cached shortest path:
 determining, by at least the processor, the shortest path between the first reference point and the second reference point using a shortest path engine to perform calculations to execute a shortest path algorithm within the database memory to determine the shortest path between the first reference point and the second reference point;
 wherein determining the shortest path between the first and second reference points includes executing an A* Path Finding algorithm upon a memory based graph, wherein the memory based graph comprises interlinked reference points having distances between reference points as edges;
 storing, by at least the processor, the determined shortest path within the database cache;
 generating a total shortest path by adding (i) the first displacement path, (ii) the shortest path between the first reference point and the second reference point, and (iii) the second displacement path; and
 returning, by at least the processor, the total shortest path in response to the request;

wherein the first data structure and the shortest path engine are resident in the same database server; and wherein the shortest path engine comprises an executable Java program stored in a Java Virtual Machine in the database server.

11. The computer-implemented method of claim 10, further comprising:

accessing a second data structure that stores routes between locations and respective reference points to which the locations are mapped in the first data structure;

selecting a first route between the first location and the first reference point and a second route between the second location and the second reference point; and returning the first route and the second route with the shortest path.

12. The computer-implemented method of claim 10, wherein determining the shortest path further comprising:

determining a requirement associated with moving an item between the first location and the second location;

determining a weighting rule corresponding to the requirement; and using a graph derived from (i) a distance between reference points and (ii) the weighting rule to determine the shortest path.

13. The computer-implemented method of claim 10, where the first data structure maps each location to: i) an entry reference point closest to the location when the location is a destination of the shortest path and ii) an exit reference point closest to the location when the location is an origin of the shortest path, the method further comprising:

selecting the exit reference point for the first location; and selecting the entry reference point for the second location.

14. The computer-implemented method of claim 10, where the first data structure maps each location to: i) a primary reference point closest to the location when the location is accessed in a primary manner and ii) an alternate reference point closest to the location when the location is accessed in an alternate manner, the method further comprising:

determining a manner in which the first location and the second location will be accessed;

when the first location and the second location will be accessed in the primary manner, selecting the primary reference point for the first location and selecting the primary reference point for the second location; and when the first location and the second location will be accessed in the alternate manner, selecting the alternate reference point for the first location and selecting the alternate reference point for the second location.

15. The computer-implemented method of claim 14, where the primary manner comprises retrieving items from the location and the alternate manner comprises stocking the location with items.

* * * * *

UNITED STATES PATENT AND TRADEMARK OFFICE
CERTIFICATE OF CORRECTION

PATENT NO. : 10,801,842 B2
APPLICATION NO. : 14/564419
DATED : October 13, 2020
INVENTOR(S) : Patel Page 1 of 1

It is certified that error appears in the above-identified patent and that said Letters Patent is hereby corrected as shown below:

In the Specification

In Column 6, Line 18, after "Oracle®" insert -- , --.

In Column 6, Line 19, delete "12C®" and insert -- 12c® --, therefor.

In the Claims

In Column 13, Line 26, in Claim 7, delete "responsive the" and insert -- responsive to --, therefor.

In Column 14, Line 43, in Claim 10, delete "responsive the" and insert -- responsive to --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*